(12) United States Patent  
Harris

(10) Patent No.: US 6,560,629 B1  
(45) Date of Patent: May 6, 2003

(54) MULTI-THREAD PROCESSING

(75) Inventor: Jeremy G Harris, Chalfont St. Giles (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/183,760

(22) Filed: Oct. 30, 1998

(51) Int. Cl.$^7$ .................................................. G06F 9/00
(52) U.S. Cl. ........................................ 709/105; 712/10
(58) Field of Search .............................. 709/102, 105, 709/100; 712/235, 10, 11

(56) References Cited

U.S. PATENT DOCUMENTS 5,553,255 A * 9/1996 Jain ............................ 712/235
5,706,514 A * 1/1998 Bonola ........................ 709/104

OTHER PUBLICATIONS

Herbert Hum and Guang Gao, "Supporting a Dynamic SPMD Model in a Multi–Threaded Architecture," 1993, IEEE, p. 165–174.*

Herbert Hum, Kevin Theobald, and Guang Gao, "Building Multithreaded Architectures with Off–the–Shelf Microprocessors," 1994, IEEE, p. 288–294.*

* cited by examiner

*Primary Examiner*—Alvin Oberley  
*Assistant Examiner*—Li Zhen

(74) *Attorney, Agent, or Firm*—O'Melveny & Myers LLP

(57) ABSTRACT

A multi-thread computer system comprising an array of thread units and associated sets of execution units. The thread units are designed to be interconnected in a one-dimensional array with other thread units of the array via respective multi-bit bi-directional communication paths for transferring threads and for relaying activity values between thread units. Each thread unit has a thread control unit. Each thread control unit has on its left side a first multi-bit input and a first multi-bit output, each connected to a first one of the bi-directional communication paths, and on its right side a second multi-bit input and a second multi-bit output, each connected to a second one of the bi-directional communication paths. Each thread control unit also has an activity sensor for determining the activity state of the thread unit as well as logic arranged to receive first and second input activity values from the first and second multi-bit inputs respectively, and an activity state signal from the activity sensor. The logic is configured to set the first and second output activity values to a maximum value when the thread unit is active and, when the thread unit is inactive, to set the first output activity value to a value one less than the second input activity value and to set the second output activity value to a value one less than the first input activity value. The thread unit also has a thread propagation controller responsive to the activity signals present at the first and second multi-bit inputs for controlling thread duplication and migration events. In further embodiments the thread units are interconnected in multi-dimensional arrays of various topologies.

10 Claims, 10 Drawing Sheets

MULTI-THREAD PROCESSING

BACKGROUND OF THE INVENTION

The invention relates to multi-thread processing, more especially to the handling of threads of control within a computer architecture that supports multi-thread processing in hardware.

Multiprogramming, or running multiple processes on a computer having fewer actual processors via time-slicing under operating-system control has been used on computer systems for a long time. Traditionally processes have distinct address spaces and are only permitted to interact via tightly constrained means.

More recently it has become common to provide for separating individual processes into threads of control which share more resources, e.g. address spaces, and so have faster communication between them to enable cooperation on a job, yet still be runnable in parallel on multiple processors. Several existing operating systems, such as Unix and SunOS, can support multi-threading by explicit or compiler-generated programming, whereby multiple, apparently concurrent threads are supported by time-slicing upon fewer actual processors.

An additional use of threads is to follow two or more possible branches of a process. For example, if a process or thread makes a control-path decision based on a binary result which is not yet established, the thread may be copied into two threads so that each can follow one possible value of the binary result. This is referred to as thread duplication. Duplicated threads may run in parallel if two processors are available. The duplicated threads may subsequently replicate further, depending on the subsequent instructions of the thread concerned. Once the binary result becomes established, the thread or threads which followed from that one of the binary results now known to be incorrect can be resolved, i.e. terminated.

To support multi-threading, a computer system thus needs a mechanism by which threads can be managed, including means for creating and terminating threads. The general goal of the designer is, of course, to provide an efficient processing capability.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to one aspect of the invention a plurality of processing units is provided which are interconnected by communication paths via which the contents of active threads can be transferred between processing units under the control of logic and driver circuits which form part of the processing units and which are arranged to act as intelligent transceiver elements controlling transfer of active threads over the inter-unit communication paths. In operation, thread duplication, for example, will proceed by running one of the threads on the same processing unit and by running the other of the threads on another processing unit. To do this the entire thread state of the originating processing unit is copied to the other processing unit.

Transferring entire thread state of threads from one processing unit to another while the threads are current provides a mechanism by which processing activity in a multi-thread process can be distributed among plural processing units so as to improve processing performance.

A thread transfer may be effected in the course of thread replication or migration. Thread duplication is a special case of thread replication which may involve the splitting of a thread into any plural number of threads. Thread migration involves the movement of a thread of control from one processing unit to another. A thread migration operation is effected by copying the entire state of the originating processing unit to the recipient processing unit and then terminating the thread in the originating processing unit.

In a preferred embodiment of the invention, the concept of activity values is used to provide each processing unit with information that can be used to decide on thread transfer to neighbor processing units. Activity values are passed between neighboring processing units via activity signals to provide each processing unit with an indication of the level of processing activity of the processing units in its vicinity.

For example, if a processing unit is running a thread and encounters an operation on an unknown binary result, then the processing unit may wish to consider whether (a) to generate a thread duplication by transferring one thread to a neighbor processing unit, (b) to stall the thread, or (c) to continue with only one of the possible two branches. To consider option (a), the processing unit can look at the activity values received from each of its neighbor processing units. One or more of the activity values may indicate that the neighbor processing unit concerned is already busy, i.e. running a thread of its own, in which case thread transfer to that processing unit would be excluded. On the other hand, so long as at least one of the received activity values indicates availability to run a thread, there is at least one neighbor processor to which a thread could be transferred. Only if all the received activity values indicate "busy"-ness, will it be necessary to consider options (b) and (c).

An important advantage of the processing unit designs herein described is their scaleability. Scaleability is possible, because each processor unit is autonomous as regards decisions on thread transfer. In particular, the activity value concept as herein described is scaleable provided that the time scales associated with the distribution of activity value signals within the array of processing units are kept shorter than the time scales associated with thread propagation within the array.

Not only may the activity value convey information on nearest, i.e. direct, neighbor processing units but, preferably, also on processing units less directly connected to the processing unit concerned, for example second neighbors or more distant neighbors. This is possible with digital activity values having more than one bit.

The composition of the activity value will depend on the protocol applied by each processing unit for generating activity values for Output. Generally, if a processing unit is active, i.e. currently running a thread, then it will output a BUSY activity value to each of its neighbor processing units. On the other hand, if the processing unit is inactive, i.e. not currently running a thread, then it will output a NOT BUSY activity value to each of its neighbor processing units. Preferably, there will be a plurality of NOT BUSY activity value levels. In this case, the different NOT BUSY activity values may indicate activity levels of processing units in the immediate or more remote proximity of the processing unit concerned and may carry a plurality of contributions from different processing units weighted according not only to proximity, i.e. distance, but also relative position, i.e. direction. The activity value may thus be a composite entity, which, although it will most usually be a scalar quantity, may contain vectorial information. A number of different activity value protocols are discussed further below.

The activity value may be discrete or continuous. In a system designed to operate with discrete activity values, bi-directional digital communication paths are provided between neighboring processing units. In one embodiment, the activity values are discrete, adopting values between 0 and 15, and are conveyed via 4-bit bi-directional communication paths. Other discrete value sets of activity values may be adopted using a multi-bit communication paths of appropriate width. In one embodiment, a two-bit communication path is used to convey a four-state activity value. A primitive implementation, adopted in another embodiment, has only a single bit of width for conveying a two-state activity value. In this case, the activity value conveys only neighbor activity information. Embodiments with a single bit activity value can be implemented with only a single wire.

A multi-thread computer system as herein described may be embodied in a wide variety of topographies. The topography of a system is defined by the neighbor structure of the processing units, i.e. by the communication paths interconnecting the processing units. To give a few examples, the processing units may be connected:

(a) in a line having two ends;
(b) in a ring;
(c) in a square or rectangular mesh;
(d) in an open-ended cylinder;
(e) in a cubic or diamond mesh; or
(f) in a torus.

The processing units may be embodied using a plurality of elements referred to as thread units (TU's) and one or more sets of elements referred to as execution units (EU's). Each set of EU's is associated with a group of TU's such that a TU of that group only issues instructions to that EU set. The TU groups may consist of one, two or more TU's. For example, in one embodiment there is a linear array of TU's and an associated linear array of EU sets, thus providing a one-to-one mapping between TU's and EU sets. In another embodiment, also based on a linear array of TU's, there is a three-to-one mapping between TU's and EU sets, each EU set being shared by three neighbor TU's. Each EU set preferably includes at least one of each type of execution unit of the system so that each EU set supports all architected instructions. Each processing unit is thus subdivided into a thread unit for handling instruction access and issue, and inter-thread unit communication and an associated execution unit set (which may be shared among several TU's) for performing the main computational work on active threads of control.

Each TU may be implemented with: a full set of architected registers, or a set of implementation registers plus rename facility to present the appearance thereof; an instruction queue or buffer; an instruction fetch/decode unit; a load/store unit; a branch unit; and an issue or dispatch unit. Internal caches may also be provided. Each TU may be configured to maintain a binary status "active"/"inactive", representing thread processing activity of that TU. A TU in the "inactive" state will not fetch or dispatch instructions.

In a processor system capable of tracking in hardware multiple threads of control and having multiple sets of hardware registers to support the threads, it is thus possible to implement speculative execution beyond branches by:

at the unresolved branch duplicating the thread context into an available register set;

executing both threads in parallel until said branch resolves;

canceling the unneeded thread on the basis of the branch resolution, thereby freeing its resources (including register set and, optionally, any operations in progress); and continuing with the needed thread untouched.

It is possible to extend this procedure to many levels of branch speculation, as many as there are register sets implemented. If upon attempting to execute a branch no register set or other thread-related resource is free, e.g. because several levels of speculation are already running and/or because several processes are running concurrently, then the thread can be stalled, as in a non-speculative execution processing system.

The available processing resources can thus be used effectively, both in a single process environment (by extensive speculative execution and dynamically creating and abandoning threads) and in a multi-process environment.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
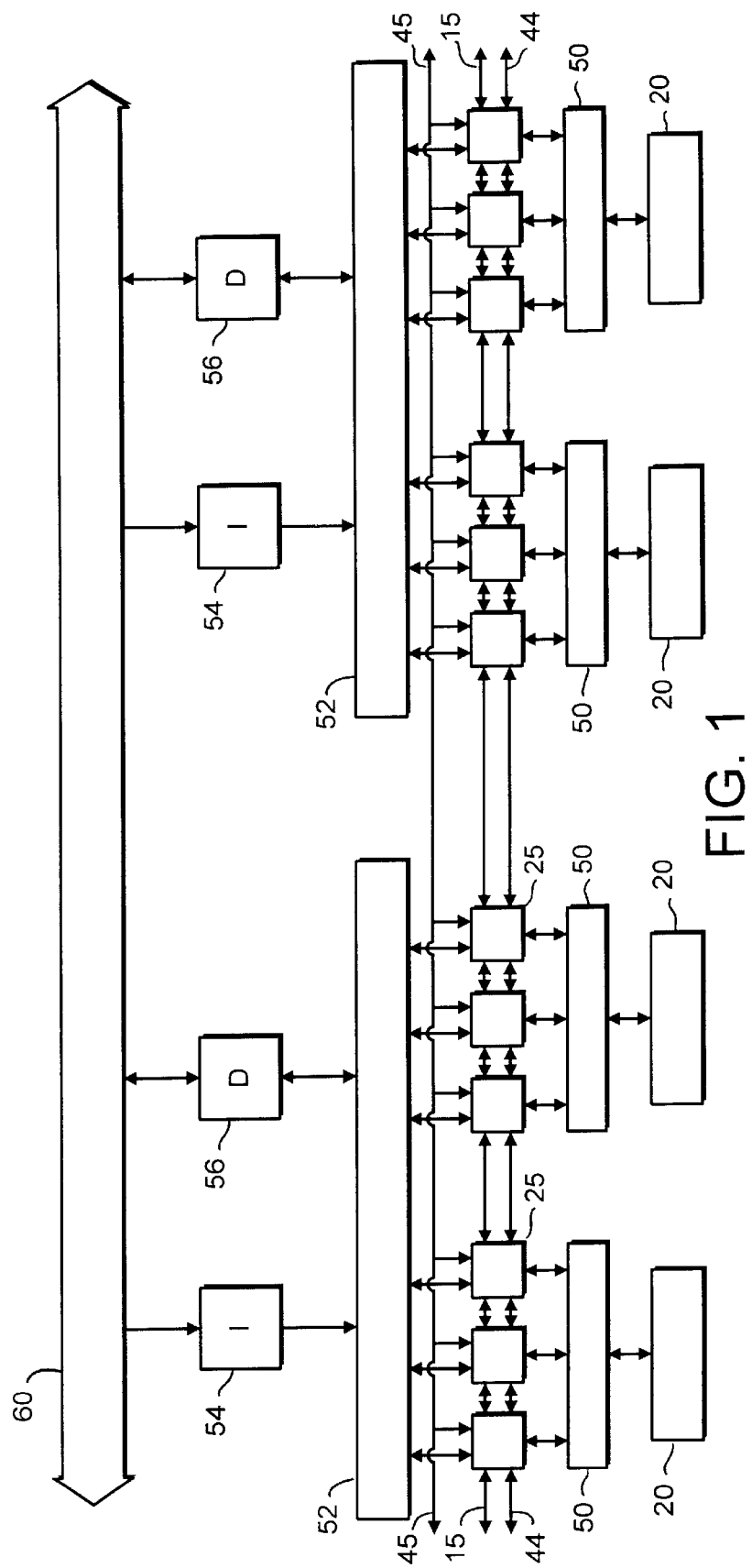
FIG. 1 shows a multi-thread computer system according to a first embodiment of the invention.

FIG. 1 shows a multi-thread computer system according to a first embodiment of the invention. A plurality of thread units (TU's) 25 are arranged in a one-dimensional array. Adjacent, or neighbor, ones of the thread units 25 are interconnected with respective pairs of bi-directional communication paths 15 and 44. Moreover, a command bus 45 is connected to each of the thread units 25.

The communication paths 15 serve to relay activity value signals between neighbor thread units 25 and will typically have a narrow width, for example four lines for four-bit parallel communication. More specifically, the lines of the communication paths 15 connect inputs and outputs on one side of each thread unit to respective outputs and inputs on the facing side of a neighbor thread unit. Relaying the activity value signals between thread units and computing the activity values within thread units is an important feature which is described in more detail further below with reference to the subsequent Figures. The communication paths 44 are used for transferring the thread state contents of a thread between neighbor thread units and will typically have a large bandwidth, for example 2048 lines for 2048-bit communication, to enable rapid thread transfer between thread units, preferably within a single clock cycle. The command bus 45 is connected to each of the thread units 25 and serves to broadcast commands to the thread units 25. Such commands may originate from one of the thread units 25 or externally, for example from the operating system.

The thread units 25 are arranged in a plurality of groups of three, four groups being shown, with each group being associated with an execution unit set 20 to form a processing cluster. Intercommunication between the elements of each processing cluster takes place through a bus 50 referred to in the following as the execution unit set buses. Pairs of the groups of thread units 25 are connected to separate system buses 52. Each system bus 52 is connected to a pair of caches, i.e. caches external to the thread units, each external cache pair comprising an I-cache 54 and a D-cache 56. Each of the I- and D-caches are individually connected to a global system bus 60.

The system shown in FIG. 1 is based on two integrated circuits, i.e. two chips. Each chip includes a pair of processing clusters, together with the associated I- and D-caches 54 and 56, and the associated system bus 52.

More generally, how the thread units, execution units and other components are integrated can be selected as desired, for example with regard to a particular application. At one extreme, the entire system may be implemented on a single chip. At another extreme, each thread unit and execution unit set may be implemented as a separate integrated circuit. However, it is preferred that at least individual processing clusters and any external caches associated therewith are integrated onto the same chip.

Moreover, in general, the total number of thread units, the number of thread units per group, the number of system buses and the number of caches may be varied independently to provide architectures other than that shown in FIG. 1 which is shown only by way of example. For example, there may be one execution unit set for each thread unit, or two, four or more thread units per cluster. Moreover, the communication links 15 and 44 leading from an endmost one of the thread units may be wrapped around to connect to the other endmost one of thread units to form a closed loop or ring of thread units. Further, the thread unit topology may be in one, two, three or more dimensions with the thread units having different numbers of neighbor thread units, as is discussed further below with reference to other embodiments of the invention.

Figure 2:
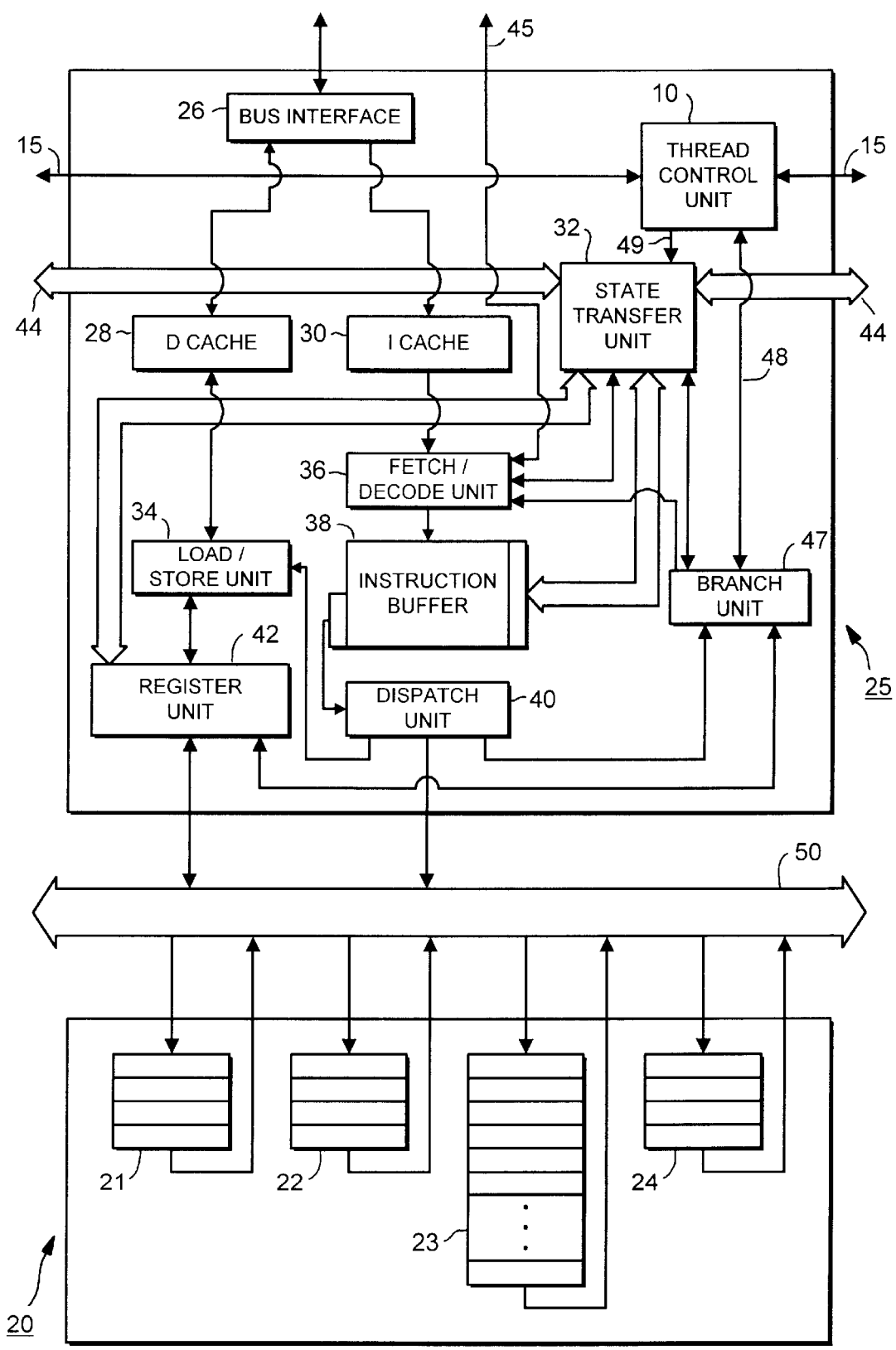
FIG. 2 shows internal structure of a thread unit and of an execution unit set of FIG. 1.

FIG. 2 shows the internal structure one of the thread units 25 and the execution unit set 20 associated therewith.

The thread unit 25 is connected to the system bus 52 (FIG. 1) through a system bus interface 26 and is connected to the EU set bus 50 through a register unit 42 and a dispatch unit 40. The register unit 42 is connected to a load/store unit 34 and a branch unit 47. A branch prediction function may also be provided. In turn, the branch unit 47 is connected to a fetch/decode unit 36 which is connected to an instruction buffer 38 and an I-cache 30, which is an internal cache of the thread unit 25 and is connected to the system bus interface 26. The load/store unit 34 is connected to a D-cache 2S, which is also an internal cache of the thread unit and is connected to the system bus interface 26. Here it is noted that the load/store and branch functions, which may be viewed as execution functions, are provided in units internal to the thread unit, rather than within the execution unit sets, although the latter arrangement would also be possible. Typically, the internal D-cache 28 is small and simple, for example a write-through cache, the caching function being supplemented by the external D-cache 56 (FIG. 1). Indeed, the internal D-cache 28 may be dispensed with, as may the internal I-cache 30. The instruction buffer 38 is also connected to the dispatch unit 40. The function, structure and interconnection of these internal units and caches follows conventional practice. In addition, a connection is provided from the command bus 45 to the fetch/decode unit 36.

Central to the thread propagation hardware of the thread unit 25 are a thread control unit (TCU) 10 and a thread state transfer unit 32, or state transfer unit (STU) for short. The thread control unit 10 provides the circuitry of the thread unit 25 responsible for handling activity value processing and activity value communication between thread units. The state transfer unit 32 provides the circuitry of the thread unit 25 responsible for effecting thread propagations between thread units, namely transmitting and receiving the entire state of a thread to or from a neighbor thread unit.

The thread control unit 10 has for each neighbor thread unit, two in this embodiment, an input and an output for receiving and transmitting activity value signals from the thread control unit of the neighbor concerned through the communication links 15. The thread control unit also has an output connected to an input of the state transfer unit 32 through a communication link 49 and an input/output connected to an output/input of the branch unit 47 through a bi-directional communication link 48. The internal structure of the thread control unit 10 is described in more detail further below with reference to FIG. 3.

The state transfer unit 32 is connected through a large number of connection lines to the registers of the register unit 42, to the instruction buffer unit 38 and to the program counter (not shown). For example, there may be 64 lines (i.e. wires) from each of 32 (thirty-two) 64-bit registers, 64 lines from each of 32 (thirty-two) 64-bit instruction buffers, plus lines for a 64-bit program counter and also a number of control lines. (Here, the bit numbers are given by way of a typical example). The thread state communication link 44 will also need to have a commensurate number of lines, for example 2048, to permit sufficiently rapid thread migration or duplication. As well as the register contents, instruction buffer contents and program counter, the thread state will also include writebacks as they become available from the execution units, and these must be transferred to the neighbor thread unit subsequent to state transfer to ensure that the thread will run correctly on its new host thread unit. Thread state transfer is under the control of the thread control unit 10 through the communication link 49.

The execution unit set 20 has a design that follows conventional practice and comprises four execution units 21, 22, 23 and 24 each of which is individually pipelined. Execution units 21 and 22 are logical/integer execution units. Execution unit 23 is a floating point multiply/add execution unit. Execution unit 24 is a divide execution unit. Other combinations of types and numbers of execution unit are possible, including non-pipelined execution units and the use of shelving buffers for execution unit instruction queues. Each execution unit is linked to the associated execution unit set bus 50 in a conventional manner.

Figure 3:
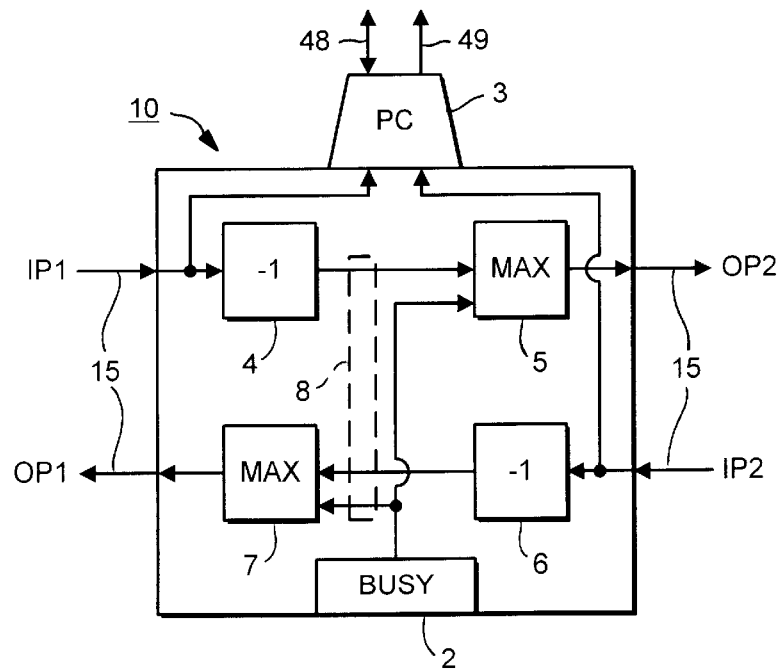
FIG. 3 shows internal structure of a thread control unit of the thread unit of FIG. 2.

FIG. 3 shows a thread control unit (TCU) 10 of a thread unit according to a first embodiment of the invention designed to operate in conjunction with the thread control units of two neighbor thread units. The thread control unit 10 has on its left side an input IP1 and an output OP1 for respectively receiving and transmitting activity values (AV's) to the thread control units of neighbor thread units through one of the communication paths 15. On the right hand side of the thread control unit 10 there is provided a further input and output in the form of IP2 and OP2 respectively through another one of the communication paths. The thread control unit has an activity sensor 2 for determining an activity state of the thread unit, and logic 4, 5, 6 and 7 for determining activity values for the Outputs OP1 and OP2 as a function of the activity signals presented to the inputs IP1 and IP2, and of the activity state of the thread unit, as determined by the activity sensor 2.

The thread control unit 10 is configured such that, when the activity state of its thread unit is BUSY, a set activity signal, here in the form of a maximum activity value $AV_{max}$, is presented to output OP1 and also to output OP2. On the other hand, when its activity state is NOT BUSY, then respective activity signals in the form of discrete activity values are presented to the outputs OP1 and OP2. In this case, the output OP2 is supplied with an activity value equal to the activity value presented at input IP1 decremented by 1, the decrementing action being carried out by logic in the form of a first decrementing unit 4, labeled −1 in the Figure. The decision on whether to output to the output OP1 the maximum activity value or the decremented input IP2 is performed by logic in the form of a greater-than tester 5, labeled MAX in the Figure. Similarly, the output OP1 is supplied with an activity value equal to the activity value presented to the input IP2 decremented by 1 by logic in the form of a second decrementing unit 6, labeled −1 in the Figure. The decision on whether to output to the output OP2 the maximum activity value or the decremented input IP1 is performed by logic in the form of a greater-than tester 7, labeled MAX in the Figure.

The thread control unit 10 also includes a thread propagation controller (PC) 3 which is connected to receive the activity values presented to the inputs IP1 and IP2. The thread propagation controller 3 has the role of deciding upon and implementing thread migrations, thread duplications and other thread propagation events. Thread duplication events, and some other thread propagation events, will generally be triggered by internal activity of the thread unit and associated execution units, but will be decided upon having regard to the activity values presented to the inputs IP1 and IP2, these activity values being supplied by communication links 15 to the thread propagation controller 3. The thread propagation controller 3 is connected through a bi-directional communication link 48 with the branch unit 47. The link is bi-directional, since, if a thread control unit 10 cannot initiate a thread propagation, for example when all activity values received have the maximum activity value, then the thread control unit needs to issue a signal to the branch unit 47 which then has to deal with the matter internally, i.e. within the thread unit, via branch commands. A further connection from the thread propagation controller 3 is to the link 49 to the state transfer unit 32. This link is for conveying thread transfer commands to the state transfer unit 32.

The decrementing units are designed to be incapable of outputting negative values so that if a value of zero is presented to the input of a decrementing unit, that decrementing unit outputs a zero value.

FIG. 3 also shows a thread control unit according to a variation of the first embodiment which includes an additional logic unit 8, shown by dashed lines in FIG. 3. The additional logic unit 8 is arranged to monitor the lines interconnecting the outputs of the decrementing units 4 and 6 to the inputs of the greater-than-testers 5 and 7. If the values on both lines are equal to $AV_{max}-1$ then the additional logic unit 8 increments by one the value on one of the lines, in this case the line between decrementing unit 4 and greater-than-tester 5. The additional logic unit 8 thus has an effect when the thread unit is not active, but both its neighbor thread units are. In this situation, instead of outputting an activity value of $AV_{max}-1$ to both neighbors, which the thread control unit would do in the absence of the additional logic unit 8, an activity value of $AV_{max}-1$ is output to one of the neighbor thread units and an activity value of $AV_{max}$ is output to the other of the neighbors. This prevents the thread unit advertising in both directions the availability to accept a new thread, thus to avoid the possibility of both neighbor thread units attempting to effect simultaneously or near-simultaneously a thread transfer to the thread unit.

Figure 4:
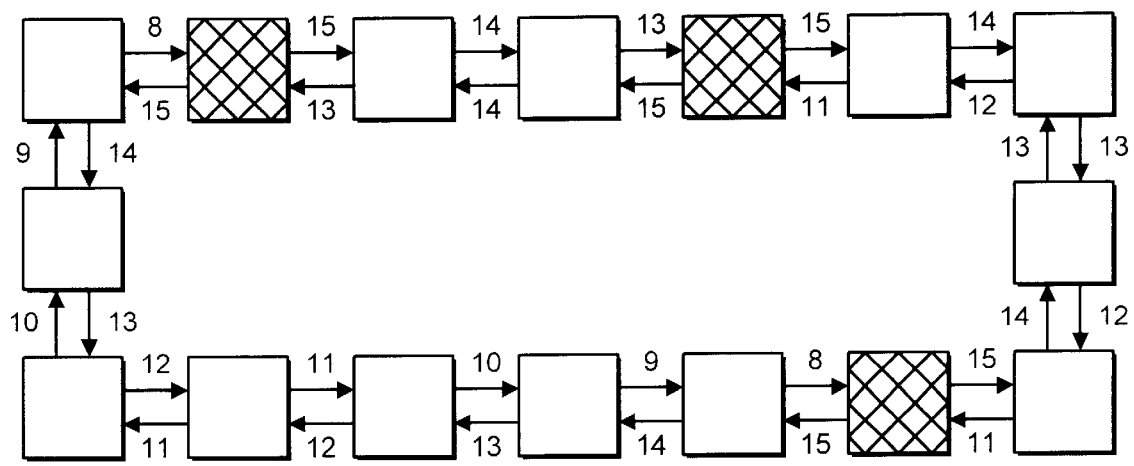
FIG. 4 shows the thread units of the first embodiment arranged in a ring, there being shown a set of example activity values, activity of a thread unit being indicated with cross-hatching.

FIG. 4 shows a ring of thread units in use. The activity value communication paths 15 are shown, but, for clarity, the thread state communication paths 44, the internal elements of the thread units and the execution unit sets are not shown. Some of the thread units are active, as illustrated by cross-hatching. FIG. 4 also shows the activity values that follow from the activity statuses of the thread units. As can be seen from FIG. 4, each active thread unit presents a maximum activity value $AV_{max}=15$ to each of its outputs OP1 and OP2. The activity values are then relayed along the ring of thread units, being decremented by 1 at each inactive thread unit. The relaying action is broken at each active thread unit, which instead outputs the maximum activity value $AV_{max}=15$ as described above. In the example of FIG. 4, the activity value is represented by a 4-bit number, having integer values in the range from 0 to 15. In hardware, the activity values may thus be conveyed along the communication paths by only four wires.

In use, if one of the active thread units decides that a thread duplication would be desirable, the thread propagation controller PC of the thread control unit of that thread unit will analyze the activity values presented to it via its inputs IP1 and IP2. If the left side activity value is less than the right side activity value, i.e. $AV_{left}<AV_{right}$, then a thread duplication is performed to the left. That is, the entire state of the thread unit is copied to the left-side neighboring thread unit via the broad-band communication path 44. Writebacks pending at the time of thread duplication are marked 'open' and are forwarded to the destination thread unit once resolved.

Thread duplication is thus performed based upon an autonomous decision of the originating, active thread unit. This has the advantage that at the time when a thread duplication is sought by an active thread unit, it is not necessary for the active thread unit to interrogate other thread units in respect of their current activity, but merely to sample its own inputs.

The numerical comparison of the activity values on the left and right sides of the thread unit causes threads to repel each other in thread unit space and so raises the probability of an adjacent thread unit being inactive and therefore available to host the duplicated thread. Referring to the specific activity values shown in FIG. 4 by way of example, if the active thread unit in the lower side of the ring wishes to duplicate a thread, its thread propagation controller PC will find an activity value $AV_{left}=8$ presented to its left side input IP1 and an activity value $AV_{right}=11$ presented to its right side input IP2. The thread unit will thus decide to duplicate the thread to the left-side neighbor thread unit, since $AV_{left} < AV_{right}$.

The underlying reason for the left side activity value being lower than the right side activity value is that, to the left, the nearest active thread unit is 8 blocks away, whereas, to the right, the nearest active thread unit is only 5 blocks away. The routing of the thread duplication to the left in this instance is thus the most intelligent decision since, although both the immediate left-side and right-side neighbor thread unit are available to receive a new thread, there is more available processing space to the left side to cope with possible future thread replication either by the newly duplicated thread or the thread currently running on the nearest adjacent thread unit to the left.

Generally, the movement of threads is given a directionality by the activity values, analogous to a heat diffusion process. Pursuing this analogy, a region of high processing activity can be thought of as a processing hot spot. The role of the thread control units, more especially their respective thread propagation controllers, is to make use of the activity values to ensure that processing 'heat' is diffused away from hot spots. In the context of thread duplication, this means that new threads are generated away from the hot spots. In the context of thread migration, discussed in more detail further below, this means that existing threads can be moved between thread units away from processing hot spots, for example as a precautionary measure.

The handling of thread migration can be largely similar to that described above with reference to thread duplication. However, with thread migration, the originating thread unit will issue no further instructions from its queue after migration, but will remain active until all writebacks to it have completed. After all writebacks have completed, the originating thread unit can be changed to an inactive state.

As stated further above, the thread propagation controller 3 has the role of deciding upon and implementing thread migrations, thread duplications and any other thread propagation events. Thread duplication events will generally be triggered by an instruction executed by a thread unit or associated execution unit set. Thread migration events may also be triggerable on the basis of the inputs IP1 and IP2. For example, migration may be decided upon as a precautionary measure to try and maintain active thread units at at least a minimum distance apart. For example, a migration could be decided upon if the left-side input IP1 receives an activity value equal to or greater than a threshold amount, $AV_{thresh}$, and if $AV_{left}-AV_{right}>1$. Corresponding logic would then also be provided in respect of the right-side input IP2. The threshold activity value could equal the maximum activity value, i.e. $AV_{max}=AV_{thresh}$, in which case migration would only be triggered if the neighbor thread unit was active, or could be set equal to some lower value. This thread migration protocol utilizes, once again, the repulsive property of the activity values.

The thread propagation controller 3 has an instruction set for duplications and migrations of:

NULL no action
ML move thread left;
MR move thread right;
NM no move (e.g. when $AV_{left}=AV_{right}=AV_{max}$); and
NP move, but no preference to move direction (e.g. when $AV_{left}=AV_{right} \neq AV_{max}$).

If a duplication is sought and no move is possible, the thread propagation controller can act in conjunction with the branch unit to (a) stall the process indefinitely, (b) stall the process until the branch direction is established or (c) predict branch and execute one side of branch only in the existing thread unit and associated EU set.

A thread may terminate in either of two ways. Firstly, as described above, when an outstanding conditional branch resolves adversely, following a thread-duplication. Secondly, due to execution of a termination instruction. This provides for deliberate cessation of processing when, for example, an end result has been computed and output, or an interrupt service routine has completed.

A set of threads which are descended from a common ancestor may be regarded as a process. Typically, a process will initiate as a single thread which may then replicate as a result of repeated thread duplications. The location of the process' threads among the thread units will also change in the course of thread duplications and migrations. Threads are tagged with a process identifier which forms part of the thread state contents and which is transferred with the state contents on thread propagations. A thread may become a new process by modifying its process identifier; this will typically be a privileged operation.

In order to unload a process from the system, for example upon an operating system decision to reallocate resources to a different process, a forced-jump command may be broadcast on the command bus 45 of FIG. 1. This instruction includes a process identifier. All active thread units compare this identifier with that of their thread; those that do not match ignore it. Thread units which match the process identifier issue no further instructions until all pending writebacks and unresolved branches are complete. This may result in thread termination, by either of the methods above. If the thread survives, the forced-jump instruction is issued; for example this may be to a system routine which copies thread state out to memory then terminates. The use of the process identifier thus supports both threads arising from multiple unresolved conditional branches and processes deliberately programmed to have multiple threads of control, on a system running multiple processes concurrently.

Threads may be programmed to deliberately duplicate by executing an instruction which is functionally similar to a conditional branch, but with no condition to resolve.

Processes may be loaded onto the system by setting up a thread as a new process, duplicating it enough times for the saved process' threads, then each thread copying in from memory the previously saved thread state.

Interrupts may be handled by having external hardware cause a forced-jump broadcast on the command bus 45 for a suitable process as set up by the operating system. If sufficient hardware resource is available this could be a process set up specifically to spin doing nothing but wait for an interrupt, or one of several such. By this means one or more thread units would be reserved to provide fast response to interrupts.

Figure 5:
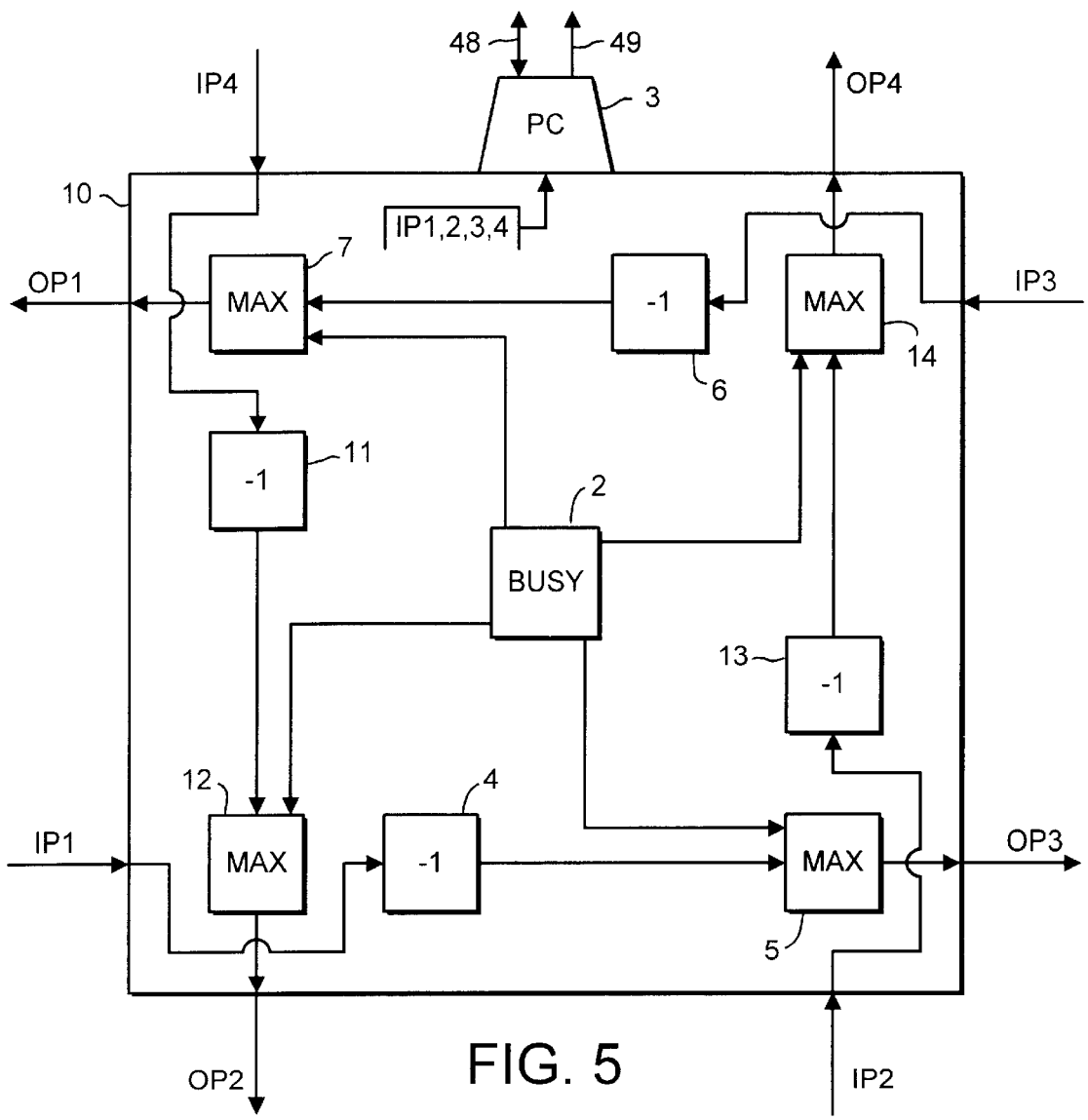
FIG. 5 shows a thread control unit of a multi-thread computer system according to a second embodiment of the invention.

FIG. 5 shows a thread control unit (TCU) 10 for a thread unit of a multi-thread computer system according to a second embodiment of the invention. In this embodiment, the thread units are designed to operate in conjunction with four neighbor thread units. The system architecture follows the general design principles described further above with reference to the first embodiment, namely with processing clusters connected to one or more levels of system bus, optionally with external caches.

The thread control unit 10 of the second embodiment has four sides, each with an activity signal input and an output. The inputs and outputs on the left, bottom, right and top sides are labeled respectively IP1, OP1; IP2, OP2; IP3, OP3; and IP4, OP4. The thread control unit 10 has an activity sensor 2 for determining an activity state of the thread unit and logic 4, 5, 6, 7, 11, 12, 13, 14 for determining activity values for the outputs OP1 through OP4 as a function of the activity signals presented to the inputs IP1 through IP4, and of the activity state, as determined by the activity sensor 2. A thread propagation controller PC 3 is also provided and serves the same function as that described further above with reference to the first embodiment.

The logic comprises four decrementing units 4, 13, 6 and 11 and four associated greater-than testers 5, 14, 7 and 12 respectively. The decrementing units 4, 13, 6 and 11 are connected to receive activity value signals from the external inputs IP1 through IP4 respectively, and to output processed activity value signals to respective inputs of the four greater-than testers 5, 14, 7 and 12 respectively. The activity value processing performed by the decrementing units consists of decrementing by one unless the inputted activity value is zero in which the processing does not alter the activity value. Each of the greater-than testers 5, 14, 7 and 12 has a further input connected to the output of the activity sensor 2 and is configured to output the greater of the two values received at its two inputs. The activity sensor is configured so that: in the case of a BUSY status of the thread unit a maximum activity value is output from the activity sensor 2 to each of the greater-than testers 5, 7, 12, 14; and in the case of a NOT BUSY status of the thread unit a minimum activity value is outputted. The greater-than testers 5, 14, 7 and 12 have respective outputs connected to the external thread control unit outputs OP3, OP4, OP1 and OP2 respectively.

In operation, each output OPn thus outputs: either an activity signal conveying the activity value received at one of the inputs IPm, where m not equal to n, less one; or an activity signal conveying the maximum activity value, the former being the case when the thread unit is in a BUSY state and the latter being the case when the thread unit is in a NOT BUSY state.

In a modification of the embodiment of FIG. 5, the thread control unit is provided with an additional logic unit (not shown) to perform a function analogous to the additional logic unit 8 described further above with reference to FIG. 3. The additional logic unit is arranged to monitor the lines interconnecting the outputs of the decrementing units to the inputs of the greater-than-testers. If the values on more than one of these lines are equal to $AV_{max}-1$ then the additional logic unit increments by one the value on all but one of the lines. The additional logic unit thus has an effect when the thread unit is not active, but more than one of its neighbor thread units are. In this situation, instead of outputting an activity value of $AV_{max}-1$ to all four neighbors, which the thread control unit would do in the absence of the additional logic unit, an activity value of $AV_{max}-1$ is output to only one of the neighbors and an activity value of $AV_{max}$ is output to the other three of the neighbors. This prevents the thread unit advertising in more than one direction the availability to accept a new thread, thus to avoid the possibility of two or more of the neighbor thread units attempting to effect simultaneously or near-simultaneously a thread transfer to that thread unit.

Figure 6:
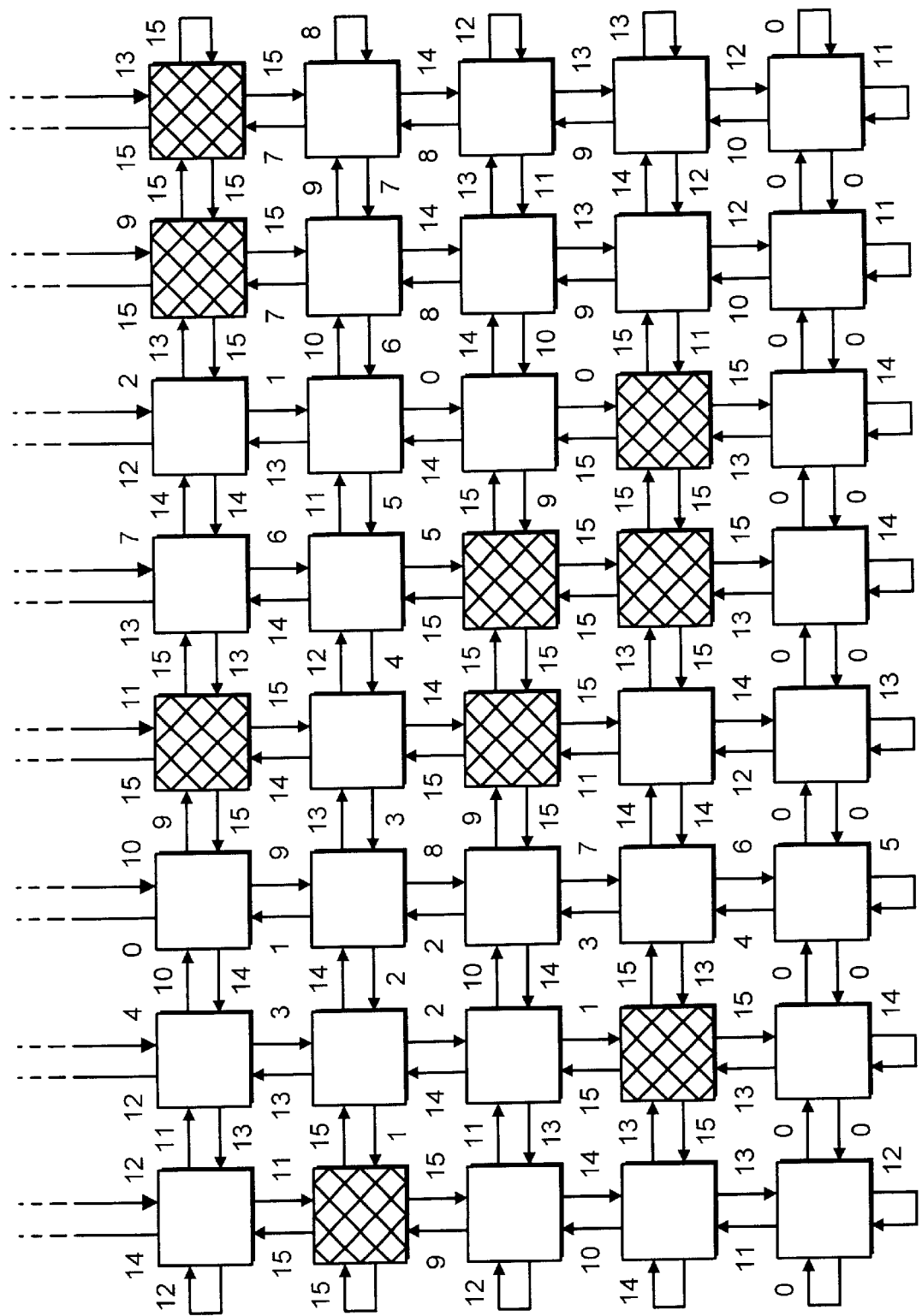
FIG. 6 shows a multi-thread computer system according to the second embodiment comprising a square two-dimensional array of the thread control units of FIG. 5, activity of a thread unit being indicated with cross-hatching.

FIG. 6 shows a plurality of the thread units of the second embodiment arranged in a two-dimensional square mesh interconnected by bi-directional AV communication paths. Each thread unit in the interior of the mesh is connected to four neighbors to the left, right, top and bottom. At the edges of the mesh, outputs are fed back into inputs on the same side of the thread unit. The communication paths serve to relay activity value signals between the thread units. For the sake of clarity, the thread state communication path and the execution unit sets associated with the thread units are not shown. FIG. 6 shows the system in use with the active ones of the thread units being indicated by cross-hatching. The activity values that follow from the activity statuses of the thread units are written adjacent the relevant parts of the communication paths. Each active thread unit presents a maximum activity value $AV_{max}=15$ to each of its outputs. The activity values are then relayed along the ring of thread units, being decremented by 1 at each inactive thread unit. The relaying action terminates at each active thread unit, which instead outputs the maximum activity value $AV_{max}=15$ as described above.

The thread propagation controller 3 has an instruction set for duplications and propagations similar to that of the thread propagation controller of the first embodiment with the additional instructions of: (a) MU, move thread up; and (b) MD, move thread down.

The thread propagation controller 3 may also be provided with an output connected to the activity sensor 2 (not shown) via which a signal can be supplied to the activity sensor to cause it to permanently act as though the thread unit were in a BUSY state. The thread propagation controller is configured to have an operational mode for outputting such a signal. This mode can be invoked when the thread unit has a fault, for example owing to component failure in the thread unit or its associated execution unit set. As a result of the repulsive property of the activity value protocol, the faulty thread unit will then permanently repel work, by permanently issuing maximum activity values to all sides. This feature may be applied effectively not only in any two-dimensional thread unit array, but also in higher dimensional thread unit arrays, or in an endless, i.e. wrapped-around, one-dimensional array such as that of the first embodiment.

Figure 7:
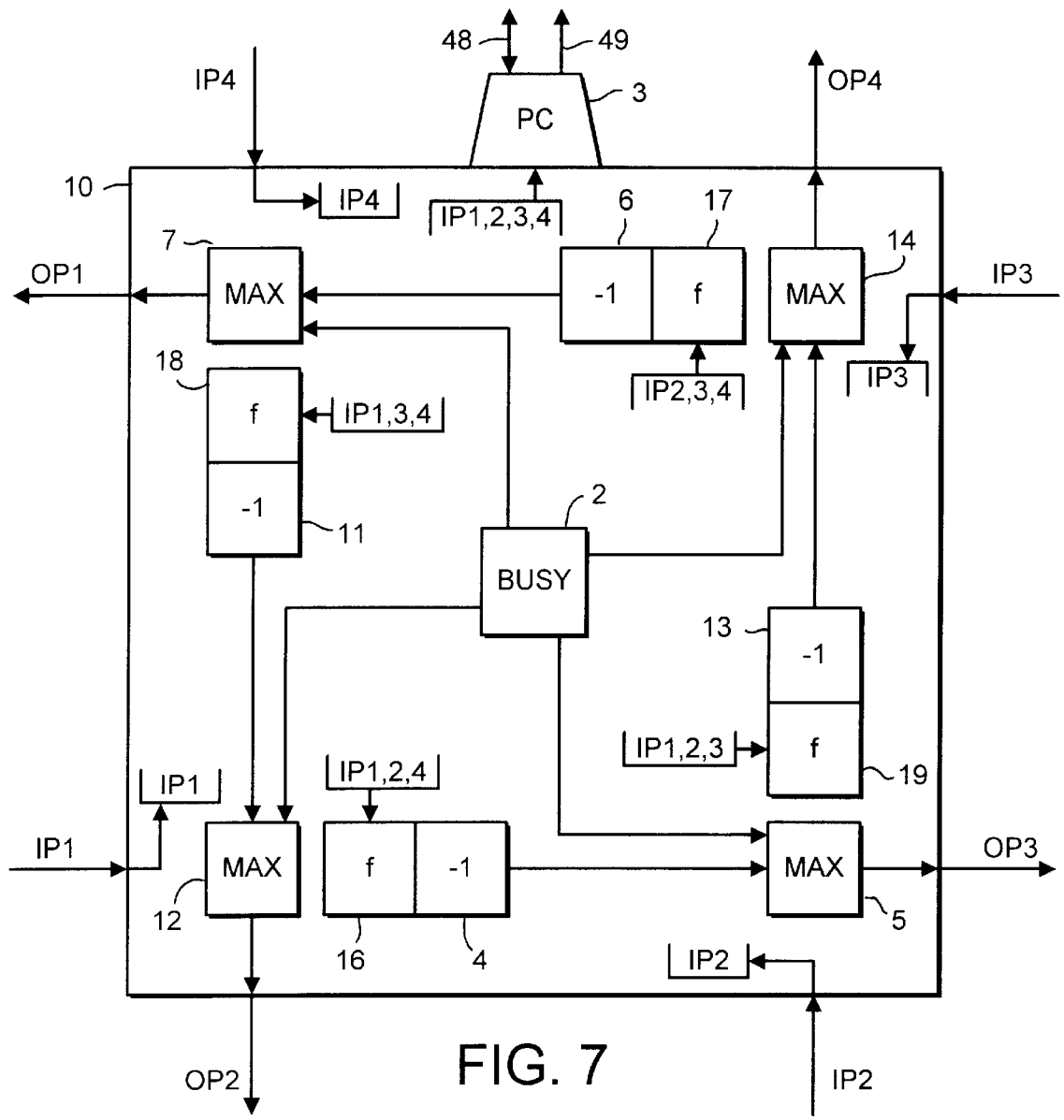
FIG. 7 shows a thread control unit of a multi-thread computer system according to a third embodiment of the invention.

FIG. 7 shows a thread control unit TCU 10 for a thread unit of a multi-thread computer system according to a third embodiment of the invention designed to operate in a thread unit interconnected with four neighbor thread units, similar to the thread unit of the second embodiment. The logic of the second embodiment differs that of the second embodiment in that four function processors 16, 17, 18 and 19, labeled 'f', are additionally provided on the input side of the decrementing units 4, 6, 11 and 13 respectively. The logic can be considered as being made up of four logic trains, each for generating one of the outputs OPn. Each logic train comprises one functional processor, one decrementing unit and one greater-than tester. The functional processor of the logic train for generating the output OPm is connected to receive inputs from all of the inputs except IPm. For example, the functional processor 18 of the logic train for generating the output OP2 is connected to receive inputs IP1, IP3 and IP4, but not input IP2. This arrangement provides for an element of directionality in the activity value relaying process.

The functional processors may be configured to carry out processing according to a wide variety of functions. For example, the function may be:

(a) to take the integer truncation of the mean of the three inputs, i.e. TRUNC(MEAN(IPa,IPb,IPc))

(b) to take the maximum of the three inputs;
(c) to take the modal average of the three inputs;
(d) to take the maximum of the three inputs and subtract it from the maximum activity value, i.e. $AV_{max}$-MAX (IPa,IPb,IPc); and
(e) to take a weighted average of the three inputs with the input coming in the same direction as the output being given greater weight, e.g. in the case of OP2, the bottom side output, IP4, the top side output, is given greater weight.

It will also be understood that the activity value scale may be inverted, for example, so that maximum activity is conveyed by a minimum activity value and minimum activity by a maximum activity value.

In a modification of the embodiment of FIG. 7, the thread unit is provided with an additional logic unit (not shown) to perform a function analogous to the additional logic unit described further above with reference to FIG. 5.

Figure 8:
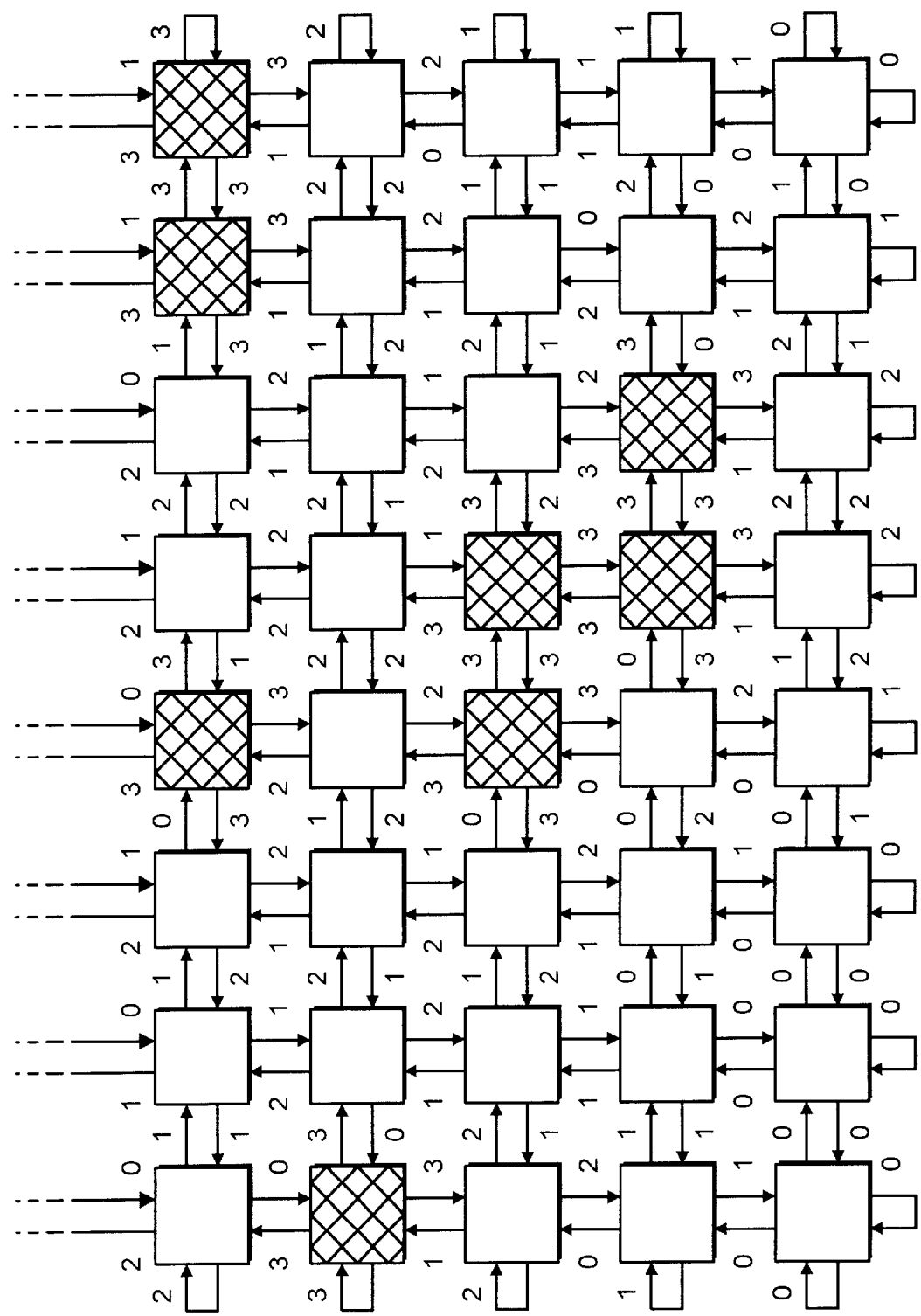
FIG. 8 shows a multi-thread computer system according to the third embodiment comprising a square two-dimensional array of the thread units, activity of a thread unit being indicated with cross-hatching.

FIG. 8 shows one example of a possible activity value set for a system made up of a two-dimensional mesh of thread units according to FIG. 7 and using a function according to paragraph (b) above, namely a maximum of the three inputs. Once again active thread units are shown cross-hatched and activity values written adjacent the associated activity value communication paths. The arrangement of interconnections is the same as that shown in FIG. 6 for the third embodiment. However, in this example, a two-bit activity value is chosen.

FIG. 9A through FIG. 9G show various topological arrangements of thread units according to further embodiments of the invention, the topological arrangement being defined by the neighbor structure of the thread units, i.e. by the thread units and their interconnections with AV communication paths.

Figure 9A:
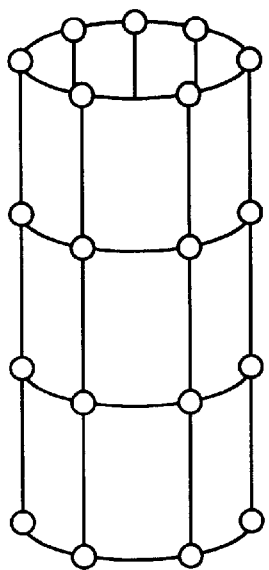
FIG. 9A through FIG. 9H show arrangements of thread units according to further embodiments of the invention.
Figure 9B:
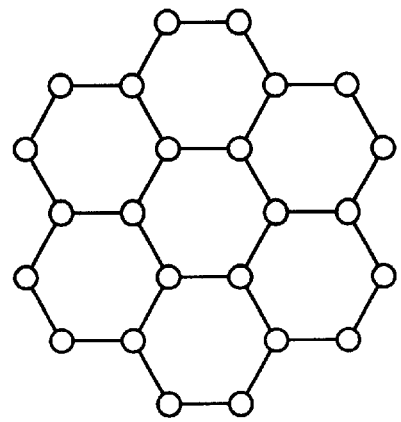
Figure 9C:
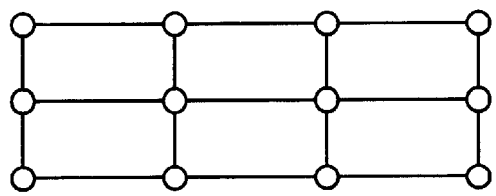
Figure 9D:
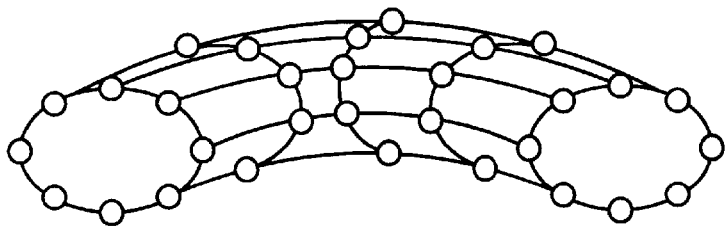
Figure 9E:
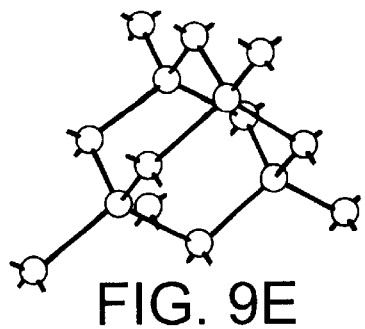
Figure 9H:
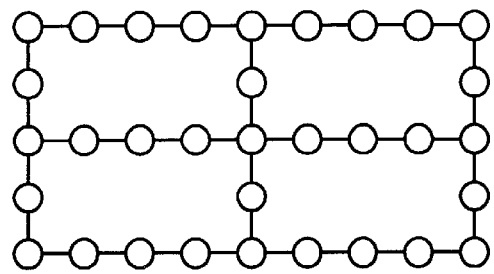
Figure 9F:
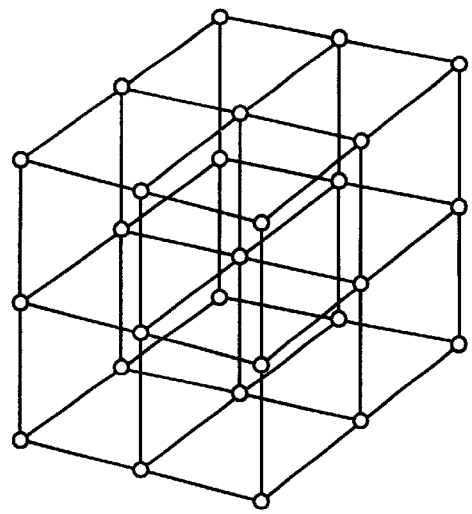
Figure 9G:

FIG. 9A shows thread units connected in an open ended cylinder, which can be thought of as a square two-dimensional array with two edges wrapped around to join one another. FIG. 9B shows thread units connected in an open-packed hexagonal two-dimensional mesh. A close-packed mesh could also be implemented. FIG. 9C shows a rectangular mesh defining a two-dimensional array in which a subset of the thread units are only connected to left and right side nearest neighbors. FIG. 9D shows a toroidal arrangement, only one half of which is illustrated for the sake of simplicity. The torus may be thought of as the open ended cylinder of FIG. 9A with the two ends joined to one another. FIG. 9E shows a diamond structure mesh defining a three-dimensional array. FIG. 9F shows a simple cubic structure defining a three-dimensional array. FIG. 9G shows a one-dimensional array similar to that of the first embodiment but with two free ends rather than closed into a ring. FIG. 9H shows another rectangular mesh defining a two-dimensional array. In the mesh of FIG. 9H some of the thread units are only connected to left and right side nearest neighbors and others only to upper and lower side nearest neighbors. From the aforegoing, a plethora of other topographies will be readily apparent to the skilled reader, for example with reference to group theory and crystallography.

Figure 10A:
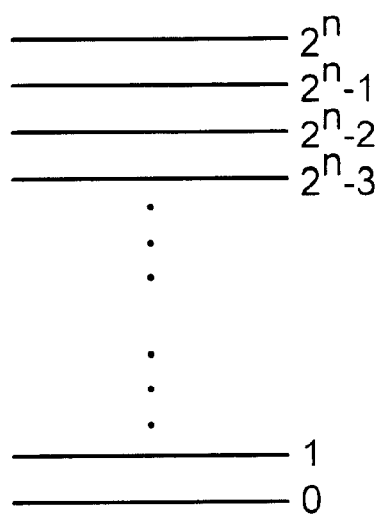
FIG. 10A shows the discrete activity values adopted in the first through third embodiments of the invention.

FIG. 10A shows the activity value state structure for discrete activity values based on base 2. For an n-bit activity value signal there will be in general $2^n$ possible activity values in the range 0 through $2^n-1$ which can be conveyed by n-wires for conveying binary signals. In some embodiments gray encoding of the digital activity value may be used.

Figure 10B:
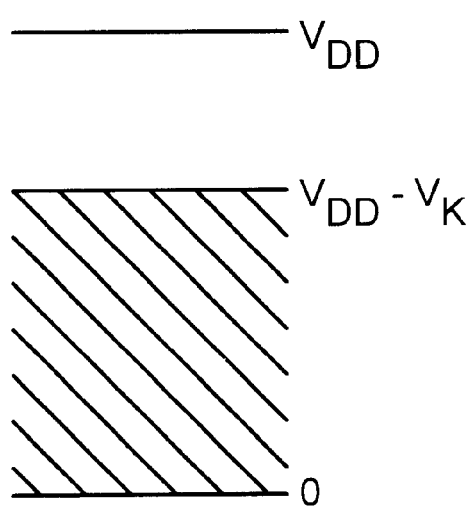
FIG. 10B shows the range of activity values adoptable in alternative embodiments of the invention utilizing analog activity values.

FIG. 10B shows an alternative scheme in which the activity values are continuous. Scalar values, typically represented by analog voltages, convey information as to how busy neighbor thread units are. A maximum activity value $V_{DD}$ is set to the system voltage and a range of activity values from 0 through $V_{DD}-V_K$ are allocated to convey non-busy activity signals. The range from $V_{DD}-V_K$ through $V_{DD}$ is reserved so as to avoid ambiguity regarding the BUSY status, which could for example be caused by noise fluctuations.

It will be appreciated that although particular embodiments of the invention have been described, many modifications/additions and/or substitutions may be made within the spirit and scope of the present invention as defined in the appended claims.

What I claim is:

1. A thread unit for processing a thread of control in a multi-thread computer system comprising a plurality of such thread units, the thread unit comprising:

thread propagation control circuitry for controlling transfer of threads to and from the thread unit;

thread state transfer circuitry for effecting the transfer of threads to and from the thread unit under the control of the thread propagation control circuitry;

a plurality of pairs of inputs and outputs for receiving and transmitting activity signals from a respective plurality of neighbor thread units;

an activity sensor for determining an activity state of the thread unit; and logic coupled to said inputs, said outputs and said activity sensor, and arranged to determine activity signals for the thread unit outputs in dependence on the activity state of the thread unit and the activity signals present at the thread unit inputs and to output the activity signals to the thread propagation control circuitry;

wherein the thread unit is configured such that, when the activity state of the thread unit is BUSY, a set activity signal is presented to each of said outputs and, when the activity state of the thread unit is NOT BUSY, then respective activity signals derived from a function of the activity signals present at said inputs are presented to said outputs and wherein said activity signal conveys a scalar value that is variable between a first value corresponding to said set activity signal and a second value.

2. A thread unit according to claim 1, wherein said function has, as an argument, a scalar value conveyed by at least one of the received input activity signals and, as a result, a value which is different from said argument.

3. A thread unit according to claim 2 operable so that, when the result of the function is not between the first and second values, then the corresponding outputted activity signal is forced to convey said second value.

4. A thread unit according to claim 2, wherein the function is a decrement function the result of which is smaller than the argument.

5. A thread unit according to claim 2, wherein, when the result of the function is not between the first and second values, then the corresponding outputted activity signal is forced to convey said second value and wherein the function is a decrement function the result of which is smaller than the argument.

6. A thread unit according to claim 1, wherein the pairs of inputs and outputs are operable to receive and transmit multi-bit activity signals.

7. A thread unit according to claim 1, operable to store a process identifier associated with a thread active on the thread unit, the process identifier being indicative of a process of which the active thread forms at least a part.

8. A thread unit according to claim 7, comprising an input for receiving commands specifying a process identifier, and operable to compare, for each such received command, the process identifier received with the command and the process identifier of any thread currently active in the thread unit, and to ignore the command if the process identifiers do not match.

9. A thread unit according to claim 1, comprising register and dispatch units for communicating between the thread unit and an external set of execution units.

10. A method for processing a thread of control in a thread unit of a multi-thread computer system comprising a plurality of such thread units, the method comprising:

controlling transfer of threads to and from the thread unit via thread propagation control circuitry;

effecting the transfer of threads to and from the thread unit under the control of the thread propagation control circuitry via thread state transfer circuitry;

receiving and transmitting activity signals from a respective plurality of neighbor thread units via a plurality of pairs of inputs and outputs;

determining an activity state of the thread unit via an activity sensor;

determining activity signals for the thread unit outputs in dependence on the activity state of the thread unit and the activity signals present at the thread unit inputs;

outputting the activity signals to the thread propagation control circuitry; and configuring the thread unit such that, when the activity state of the thread unit is BUSY, a set activity signal is presented to each of said outputs and, when the activity state of the thread unit is NOT BUSY, then respective activity signals derived from a function of the activity signals present at said inputs are presented to said outputs;

wherein said activity signal conveys a scalar value that is variable between a first value corresponding to said set activity signal and a second value.

* * * * *